Patented May 30, 1939

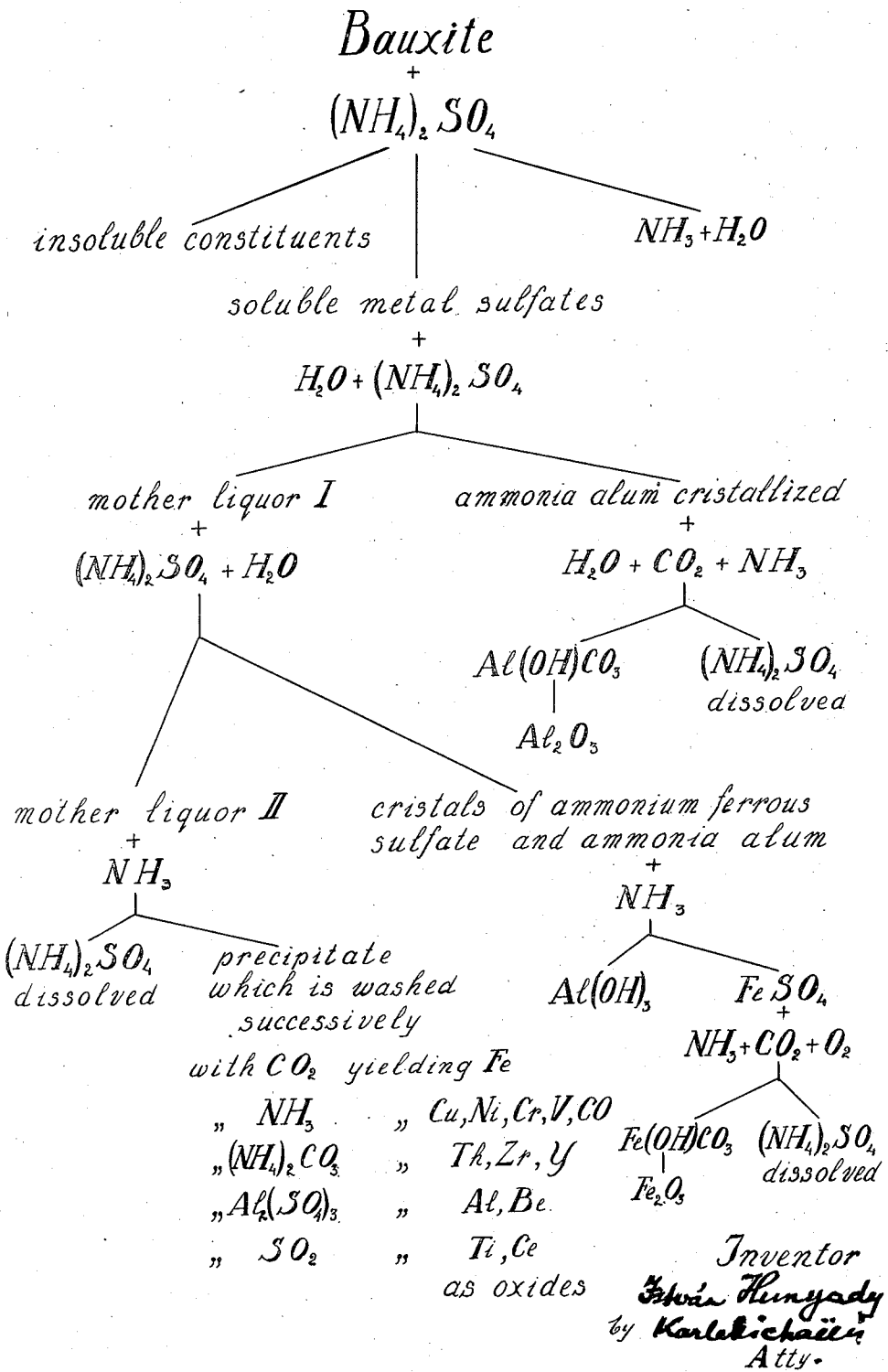

2,160,148

UNITED STATES PATENT OFFICE 2,160,148

TREATMENT OF ALUMINUM ORES

István Hunyady, Rakospalota, Hungary

Application April 2, 1936, Serial No. 72,442
In Hungary April 12, 1935

11 Claims. (Cl. 23—118)

My invention relates to the treatment of ores containing aluminum as main constituent and more especially to a method of recovering valuable compounds from ores or other materials containing an aluminum compound and in addition thereto a compound or compounds of some other metal.

My invention is more particularly adapted to the treatment of aluminum ores and of the so-called "red sludge" which is the residue obtained in the basic decomposition of bauxite.

As is well known to those skilled in the art, in the aluminum ores the oxide or silicate or other compounds of a metal are seldom encountered alone. They are mostly accompanied by compounds such as the oxides, silicates or carbonates of other metals. In such ores there are always present, besides the aluminum oxide, iron oxide, silica, titanic acid and chemically combined water, and, according to the occurrence, the ores may contain one or the other rare earth metals and compounds of beryllium, vanadium, chromium, copper, nickel, manganese, calcium and magnesium.

In the hitherto known processes for the chemical treatment of aluminum ores as a rule only the main constituents of the ores have been obtained, whereas the other constituents, often valuable ones, remained in the waste and were lost. Thus, when for instance aluminum ores were treated, in accordance with Bayer's basic decomposition process, a great part of the secondary metals contained in the ores remained in the so-called "red sludge" which is obtained in filtering the solution of sodium aluminate and which forms a valueless waste.

It is an object of my invention to separate the various metal compounds (oxides) present—even if in very small proportions—in aluminum ores and to obtain these compounds in such purity as to be adapted to be used in the respective manufactures without further purification.

It is a further object of my invention to render economical also the working of such ores which hitherto could not be worked economically owing to the great amounts of secondary metal compounds accompanying the main constituent. This is true quite especially of aluminum ores which contain large percentages of silica and titanium and cannot be treated economically according to the usual basic process of Bayer.

It is a still further object of my invention to treat the "red sludge" obtained in the Bayer process.

I wish it to be understood that wherever in this specification the expression "aluminum ore" is used, it is intended to included all such mineral products (mining products) which contain aluminum beside secondary metals.

According to the essence of my invention I mix the starting material, for instance the ore or the "red sludge", with ammonium sulfate and heat the mixture for decomposition in a known manner, wherein the metal compounds (oxides) present are converted into sulfates soluble in water under development of ammonia. I dissolve these metal sulfates in acidulated water, separate off the insoluble constituents such as silica, and then treat the solution in the following steps which include fractional cystallization:

(a) First, that aluminum sulfate is caused to crystallize from the solution (crystallization I), under addition of ammonium sulfate, in the form of aluminum alum;

(b) In order to separate the secondary metal compounds, an ammonium sulfate solution is added to the mother liquor (mother liquor I) separated from the crystals, after the ferric salts have been reduced, and iron sulfate is caused to crystallize out from the solution as ammonium ferrous sulfate (crystallization II);

(c) Into the mother liquor (mother liquor II) separated from the crystals ammonia is introduced. The precipitate forming thereby and which contains the various secondary metals under the form of hydroxides, is filtered off and (d) This precipitate is treated in the cold with solvents for these metal hydroxides, according to the hydroxides present with carbonated water, with water containing ammonia, with ammonium carbonate solution, with aluminum sulfate solution, with an aqueous solution of sulfur dioxide or the like or with some of these solutions in succession.

I subject the products obtained in the steps (a), (b) and (d) to a further treatment to obtain the individual metal oxides. This further treatment will be illustrated by the following example which deals with the treatment of a bauxite containing the substances mentioned above. In the example the several steps are discussed singly in separate sections for the sake of clearness.

The decomposition of the ore

The ore, as it comes from the mine, is dried and finely pulverized; it is then mixed with ammonium sulfate solution and the mixture is evaporated, at 100–120° C. and at atmospheric or increased pressure, to complete dryness. The ammonium sulfate may also be mixed in powder-form with the finely pulverized ore, or the dry ammonium sulfate obtained from its solution may be pulverized together with the dried ore; the first mentioned method is, however, more advantageous, because on the one hand it is difficult to mix the powdered ore with the powdered ammonium sulfate, and on the other hand the ammonium sulfate is recovered in the form of a solution in the process itself.

It is known that the ammonium sulfate, when heated in a dry state, decomposes at about 150° C. to form ammonia and acid ammonium sulfate and that, on further increasing the temperature, the latter will decompose into ammonia, sulfuric acid anhydride and water. This decomposition comes to an end at about 300° C. The reactions proceed according to the equations:

$$(NH_4)_2SO_4 = (NH_4)HSO_4 + NH_3$$
$$2(NH_4)HSO_4 = 2NH_3 + 2SO_3 + 2H_2O$$

If during the decomposition of the ammonium sulfate a metal oxide should be present which is capable of forming with the sulfuric acid anhydride forming in the process a sulfate, the following reaction will occur:

$$X_2O_3 + 3(NH_4)_2SO_4 = X_2(SO_4)_3 + 6NH_3 + 3H_2O$$

wherein X is a trivalent metal.

Thus, the ammonium sulfate is particularly adapted for the sulfatation of the metal oxides contained in the ore.

In order to convert the metal oxides into sulfates, concentrated sulfuric acid may also be used, but the sulfuric acid anhydride formed from ammonium sulfate has a considerably stronger chemical effect, since in nascent state it attacks the oxides or silicates and is capable of sulfatizing a number of oxides which are not attacked by concentrated sulfuric acid. This sulfuric acid anhydride further offers the advantage of not corroding the reaction vessel, since on the wall of the vessel a thin coating of dry sulfate will be formed which protests the vessel against further chemical attacks.

The metal oxides contained in the ore are sulfatized in a closed vessel to collect the escaping ammonia without any loss. The mixture of starting material and ammonium sulfate, prepared as described above, is gradually heated to 350° C., the sulfatized substance remaining over in the vessel, while sulfuric acid anhydride, if present in excess, and ammonia and steam escape. The amount of ammonium sulfate to be added to the substance to be sulfatized is chosen in accordance with the chemical composition of the material. It is preferred to carry through the sulfatation under reduced pressure, since in this manner the process proceeds more rapidly.

The crystallization I

The sulfatized material is entered into a quantity of water which just suffices to dissolve at 100° C. the soluble sulfates. During the dissolving the water is heated to 100° C., hot air being simultaneously blown in to convert the ferrous salts into ferric salts. To the solution, which is not yet separated from the insoluble constituents such as silica, so much sulfuric acid is added that it contains 0.1–0.2% free sulfuric acid, whereby hydrolysis of the ferric sulfate is avoided. After the sulfates have been completely dissolved, the insoluble constituents are separated from the solution, e. g. by filtering. To the solution water and solid or dissolved ammonium sulfate is added as crystallization-promotor, the quantity being so chosen that the aluminum sulfate may form with the ammonium sulfate an ammonia alum which is slightly soluble in water and crystallizes readily, being constituted according to the formula $(NH_4)_2SO_4 \cdot Al_2(SO_4)_3 \cdot 24H_2O$ To this end the liquid, while still warm, is carried into a crystallizing apparatus wherein on cooling the solution the ammonia alum precipitates in a crystalline form. The crystals are separated, e. g. by centrifuging, from the mother liquor (mother liquor I), which contains the metal sulfates, and are recrystallized repeatedly, whereby a perfectly pure ammonia alum is obtained, the further treatment of which is explained below. It should be noted that the insoluble constituents such as the silica etc. may also be removed from the mother liquor I after the crystallization I has taken place.

The treatment of the mother liquor I (crystallization II)

The mother liquor I is concentrated by evaporation and a reducing gas, preferably sulfur dioxide, is then introduced, which converts the ferric sulfate by reduction into the more readily crystallizing ferrous sulfate, free sulfuric acid being formed. The reaction proceeds according to the equation $$Fe_2(SO_4)_3 + SO_2 + xH_2O = 2FeSO_4 + 2H_2SO_4 + xH_2O$$

After the reduction has come to an end, ammonium sulfate solution is added to the mother liquor and the mixture is heated to 100° C. The hot solution is once more transferred into a crystallizer, wherein on cooling crystallize out ammonium ferrous sulfate $(FeSO_4 \cdot (NH_4)_2SO_4 \cdot 6H_2O)$ as well as, in the form of ammonia alum, the aluminum sulfate, which remained in solution during the crystallization. These crystals are separated, e. g. by centrifuging, from the mother liquor (mother liquor II). In the mother liquor there remain all such metal sulfates which will not form an alum with the ammonium sulfate, furthermore the ferrous sulfate which has not crystallized out, and the free sulfuric acid.

The treatment of the crystals obtained in crystallization II

The crystals are dissolved in cold water and are treated in the cold in a closed vessel with dilute ammonia free from oxygen and carbonic acid. Aluminum hydroxide is precipitated together with the hydroxides of those metals, the sulfates of which, if present, form with ammonia more readily hydroxides than the ferrous sulfate. The precipitate is filtered off and into the filtrate, which contains the ferrous sulfate, hot air, ammonia and hot scrubbed flue gases containing carbonic acid are introduced. Besides ammonium sulfate there is formed in the first place ferrous carbonate which however, under the influence of the oxygen of air, changes into basic ferric carbonate which is insoluble in water and may be easily filtered off. It is filtered and dried and ferric oxide is obtained as final product. The filtrate containing ammonium sulfate is returned into the process. The chemical reactions proceed according to the equations:

$$FeSO_4 + CO_2 + 2NH_3 + xH_2O = FeCO_3 + (NH_4)_2SO_4 + xH_2O$$

$$FeCO_3 + O_2 + xH_2O = Fe(OH)CO_3 + xH_2O$$

$$2Fe(OH)CO_3 = Fe_2O_3 + H_2O + CO_2$$

The treatment of the mother liquor II

The mother liquor II which contains free sulfuric acid, is introduced into a closed vessel and treated in the cold with dilute ammonia free from oxygen and carbonic acid. This causes the hydroxides of those metals to be precipitated, the sulfates of which form with ammonia more readily hydroxides than ferrous sulfate, viz. the hydroxides of titanium, of the rare earth metals, of beryllium, copper, chromium, vanadium etc., while the salts which did not crystallize out in the crystallization II, viz. ammonium sulfate and ferrous sulfate, remain dissolved. The precipitate is filtered off and treated further as described below, while the filtrate is entered into an oxidation vessel, wherein it gives up its iron content, whereafter the solution of pure ammonium sulfate is returned into the process.

The precipitate is washed in the cold in the following successive stages:

1. First the precipitate is washed with carbonated water which dissolves the ammonium sulfate, which may still be present, and, in the form of acid ferrous carbonate, the ferrous hydroxide which may have separated out.
2. The precipitate, after having been washed out with water, is washed with water containing ammonia, which extracts the metal hydroxide soluble therein such as those of copper, nickel, chromium, vanadium, cobalt etc.
3. The precipitate, after having been washed out with water, is washed with a solution of ammonium carbonate, which extracts the hydroxides of zirconium, thorium, yttrium etc.
4. The precipitate, after having been washed out with water is washed with a solution of aluminum sulfate, which extracts the hydroxides soluble therein such as those of aluminum and beryllium.
5. The precipitate, after having been washed out with water, is washed with an aqueous solution of sulfur dioxide, which extracts the hydroxides, soluble therein, of the metals of the cerium group etc.

The treatment of the various washing liquids

1. From the solution, which contains carbonic acid, the carbonic acid is expelled by boiling and air is introduced into the solution, whereby ferric hydroxide is precipitated, which is filtered off and calcined to form ferric oxide. The filtrate, a solution of ammonium sulfate, is returned into the process.
2. From the solution which contains the ammonia, the ammonia is expelled by boiling, whereby the hydroxides of chromium, nickel and cobalt are precipitated, while the vanadates of copper and ammonium remain dissolved. The precipitate is filtered off; in the filtrate acidulated with sulfuric acid the copper is precipitated with the aid of hydrogen sulfide, the filtrate is evaporated to dryness and the residue is calcined to yield vanadium pentoxide.
3. From the solution, which contains the ammonium carbonate, this compound is expelled by boiling, whereby the metal hydroxides dissolved therein are precipitated, which are filtered off and calcined to form the corresponding oxides.
4. The solution which contains aluminum sulfate, is vigorously boiled, whereby basic aluminum sulfate is precipitated. The amount of the precipitated basic aluminum sulfate corresponds to the amount of aluminum hydroxide, which was dissolved by the cold solution of aluminum sulfate when washing the precipitate (see above under 4). The filtrate obtained by filtering the precipitate of basic aluminum sulfate and containing aluminum sulfate and beryllium sulfate is repeatedly employed for washing the precipitate mentioned above under 4 in order to increase its beryllium content. To the solution containing a correspondingly higher percentage of beryllium ammonium sulfate is added and ammonia alum is allowed to crystallize out. In the mother liquor separated from the crystals the beryllium sulfate and part of the aluminum sulfate present remain over. This mother liquor is introduced into a solution which contains an excess of ammonium carbonate. Basic aluminum carbonate precipitates at 40° C., while the beryllium carbonate remains dissolved. From the filtrate of this precipitate the ammonium carbonate is expelled by boiling, while basic beryllium carbonate is precipitated. This precipitate is filtered off and calcined and yields beryllium oxide.

5. From the solution, which contains the sulfur dioxide, this latter is expelled by boiling, sulfites being precipitated. The precipitate, which forms, is filtered off and calcined, whereby the oxides of the metals of the cerium group are obtained.

The further treatment of the crystals of ammonia alum

The ammonia obtained in the sulfatation is cooled and collected in water. Into the ammonia solution cold carbonic acid (flue gas) is introduced, with which the ammonia will form ammonium carbonate. If more carbonic acid than required for the formation of the neutral carbonate is introduced into the ammonium carbonate solution, ammonium bicarbonate is formed.

Into the solution, thus prepared, of ammonium carbonate or ammonium bicarbonate the crystals of ammonia alum, obtained in the crystallization I, are introduced. Carbonic acid is developed and basic aluminum carbonate is precipitated, while ammonium sulfate and an excess of ammonium carbonate or ammonium bicarbonate remain in solution. The chemical reaction proceeds according to the equation:

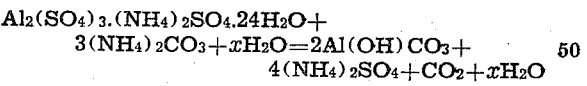
$$Al_2(SO_4)_3.(NH_4)_2SO_4.24H_2O + $$
$$3(NH_4)_2CO_3 + xH_2O = 2Al(OH)CO_3 + $$
$$4(NH_4)_2SO_4 + CO_2 + xH_2O$$

If the basic aluminum carbonate, on being filtered off and washed, is slowly heated to 100° C., it loses the whole of the carbonic acid and changes into an extremely fine powder. This fine powder is particularly suitable for use as a filler or high-grade white pigment and may replace zinc white.

If however, the filtered and washed aluminum carbonate is vigorously boiled in the presence of water either at atmospheric or at increased pressure, it loses its content of carbonic acid and is changed into an aluminum oxide-hydroxide compound according to the equation:

$$Al(OH)CO_3 + xH_2O = Al(OH)O + CO_2 + xH_2O$$

The precipitate is insoluble in water. If it is filtered off and rapidly dried or calcined, a hard aluminum oxide is finally obtained, which may be employed to produce aluminum metal. The chemical reaction proceeds as follows:

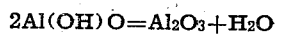
$$2Al(OH)O = Al_2O_3 + H_2O$$

The course of the process described above is illustrated in the flow sheet annexed to this specification and forming part thereof, which shows that in the individual stages of the process ammonium sulfate solution is recovered, which is returned into the process after the impurities such as for instance iron compounds have been removed. In a well conducted operation, apart from the unavoidable small losses, all the ammonium sulfate used is regenerated.

The treatment of the precipitate obtained from the mother liquor II depends from the secondary metals present in the ore. If some metals or groups of metals mentioned in the above example as secondary metals are lacking, one or the other washing operation may be omitted; if however other secondary metals should be present, the precipitate will have to be subjected to further washing treatments.

Any titanium present finally remains as an insoluble constituent in the precipitate and may be subjected to further treatment.

In treating "red sludge" however the process described above in connection with aluminum ores must be carried through, as the "red sludge" also contains as a rule some per-cents of aluminum.

Various changes may be made in the details disclosed in the foregoing specification without departing from the invention or sacrificing the advantages thereof.

I claim:

1. The method of working by chemical treatment an ore, or a material obtained by decomposing an ore, containing, besides aluminum compounds in substantial proportion, compounds of iron and certain other metals, which comprises the steps of mixing the said material with ammonium sulfate, heating the mixture thus obtained to develop ammonia and produce, from metal compounds contained in the starting material, metal sulfates which are soluble in water, dissolving said metal sulfates in acidulated water, separating the solution thus obtained from any insoluble constituents, adding ammonium sulfate to this solution and concentrating the same, causing the dissolved aluminum sulfate to crystallize out substantially pure in the form of ammonia alum, separating the precipitate thus obtained from the mother liquor (mother liquor I), reducing any ferric compound dissolved in said mother liquor and then adding to said mother liquor a solution of ammonium sulfate, causing the main part of the iron sulfate, present in the liquid mixture thus obtained, to crystallize out in the form of ammonium ferrous sulfate in admixture with ammonium alum, separating from the precipitate thus obtained the mother liquor (mother liquor II) which is an aqueous solution of ammonium sulfate, introducing into the last-mentioned mother liquor ammonia, filtering off the precipitate thereby formed and washing it with a solvent for a metal hydroxide contained in the last-mentioned precipitate.

2. The method of claim 1, in which the material under treatment is a "red sludge" recovered in the basic decomposition of bauxite.

3. The method of claim 1, wherein the precipitate last-mentioned, which is formed on the introduction of ammonia, is washed with an aqueous solution of an ammonium compound.

4. The method of claim 1, wherein the precipitate last-mentioned in claim 1, which is formed on the introduction of ammonia, is washed with a plurality of solvents, one after the other, for the metal hydroxides contained in said precipitate.

5. The method of claim 1, wherein the ammonium sulfate solution formed in the course of the process is freed from impurities and returned into the process.

6. The method of claim 1, wherein the precipitate last mentioned, which is formed on the introduction of ammonia, is washed with an aqueous solution of ammonium carbonate, comprising the further steps of separating from said precipitate the liquid with which it has been treated, boiling said liquid to expel ammonium carbonate, filtering the metal precipitate formed thereby and calcining it to expel hydroxide water.

7. The method of working by chemical treatment an ore, or a material obtained by decomposing an ore, containing, besides aluminum compounds in substantial proportion, compounds of iron and certain other metals which comprises the steps of mixing the said material with ammonium sulfate, heating the mixture thus obtained to develop ammonia and produce, from metal compounds contained in the starting material, metal sulfates which are soluble in water, dissolving said metal sulfates in water, acidulated with hot sulfuric acid, introducing into said acidulated water hot air during the solution of said metal sulfates, separating the solution thus obtained from any insoluble constituents, adding ammonium sulfate to this solution and concentrating the same, causing the dissolved aluminum sulfate to crystallize out substantially pure in the form of ammonia alum, separating the precipitate thus obtained from the mother liquor (mother liquor I), reducing any ferric compound dissolved in said mother liquor and then adding to said mother liquor a solution of ammonium sulfate, causing the main part of the iron sulfate, present in the liquid mixture thus obtained, to crystallize out in the form of ammonium ferrous sulfate in admixture with ammonia alum, separating from the precipitate thus obtained the mother liquor (mother liquor II), introducing into the last-mentioned mother liquor ammonia, filtering off the precipitate thereby formed and washing it with a solvent for a metal hydroxide contained in the last-mentioned precipitate.

8. The method of claim 1 wherein the precipitate last-mentioned, which is formed by the introduction of ammonia, is washed with an aqueous solution of ammonia.

9. The method of claim 1 wherein the precipitate last-mentioned, which is formed by the introduction of ammonia, is washed with an aqueous solution of ammonium carbonate.

10. The method of claim 1, wherein the precipitate last-mentioned, which is formed by the introduction of ammonia, is washed with an aqueous solution of sulfur dioxide.

11. The method of claim 1, wherein the mother liquor I is treated with sulfur dioxide for the reduction of ferric compounds dissolved therein.

ISTVÁN HUNYADY.